UNITED STATES PATENT OFFICE.

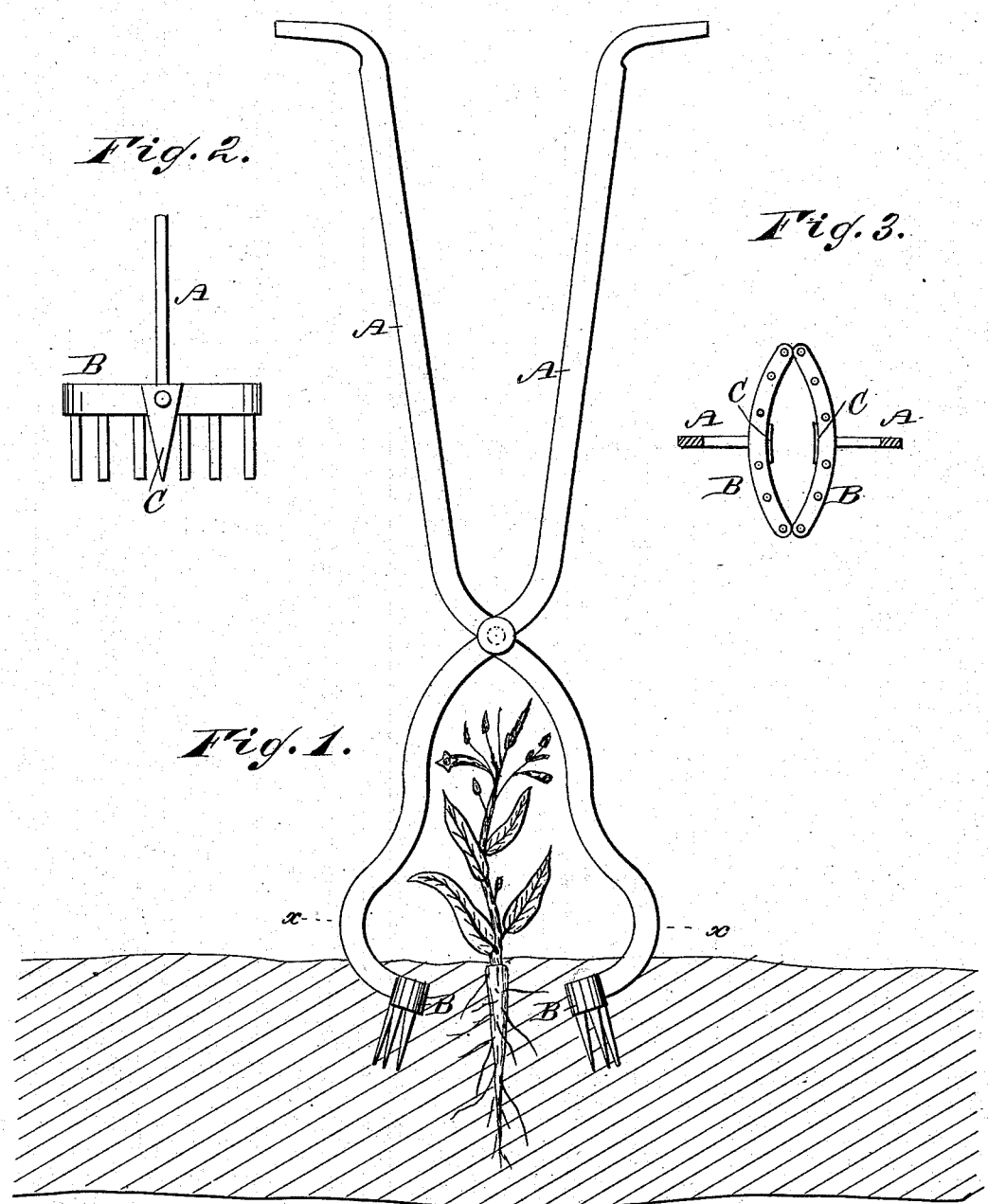

FREDERICK VISSCHER, OF MOUNT STERLING, KENTUCKY.

TRANSPLANTING IMPLEMENT.

SPECIFICATION forming part of Letters Patent No. 289,186, dated November 27, 1883.

Application filed June 9, 1883. (No model.)

*To all whom it may concern:*

Be it known that I, FREDERICK VISSCHER, of Mount Sterling, county of Montgomery, Kentucky, have invented a new and Improved Transplanting Implement, of which the following is a full, clear, and exact description.

The object of my invention is to provide a new and improved implement for pressing the earth against the roots of plants that have been transplanted.

Reference is to be had to the accompanying drawings, forming a part of this specification, in which similar letters of reference indicate corresponding parts in all the figures.

Figure 1 is a longitudinal view of my improved transplanter, showing the manner in which it is used. Fig. 2 is an inner side view of one of the rakes; and Fig. 3 is a sectional plan view of the implement on line $x\ x$, Fig. 1, and showing the rake closed.

Two levers, A, provided in the upper ends with suitable handles, are crossed, and are pivoted to each other at the crossing. To the lower end of each lever a segmental rake or pronged bar, B, is fastened, the concave parts of the rakes facing each other, as shown. The teeth are formed along the central line of the rake-bars. To the middle of the concave curve of each rake-bar B a downwardly-projecting triangular or like plate, C, is riveted or otherwise fastened, so that the said plate-tooth will be out of the plane of the other teeth—that is, it is to be nearer the center of the circle of the segment than the other teeth at the middle of the rake or pronged bar.

After a plant has been planted and rests loosely in the earth the earth must be packed firmly around the roots, &c. To accomplish this the upper ends of the levers A are separated, whereby the curved rakes will also be separated, and the latter are then forced into the ground in such a manner that one will be at each side of the plant. The upper ends of the levers A are then pressed toward each other, and thereby the rakes B will be moved toward each other, and will pack the earth firmly around the roots. The plates C at the centers of the rakes are to be in line with the roots, and will compress the earth in which the root is more firmly than the earth between the other parts of the rakes.

By means of the above-described implement the earth can be packed and pressed very easily and rapidly, and the plants are not injured.

I am aware that it is not new to use the compressing-teeth; but

What I claim as new and of my invention is—

In a transplanter, the combination of the two levers A, pivoted to each other, the curved rakes B, attached to the lower ends of the levers, and the teeth C, secured to the middle of the concave side of each rake, substantially as shown and described.

FREDERICK VISSCHER.

Witnesses:
JOHN O. MILLER,
JNO. G. WINN.